United States Patent [19]

Anderson et al.

[11] Patent Number: 4,629,156
[45] Date of Patent: Dec. 16, 1986

[54] PRESSURE RELIEF AND SHUT-OFF VALVE

[75] Inventors: Thomas K. Anderson, Cherry Valley; Carl E. Finley, Belvidere, both of Ill.

[73] Assignee: Century Tool & Manufacturing Co., Cherry Valley, Ill.

[21] Appl. No.: 637,265

[22] Filed: Aug. 3, 1984

[51] Int. Cl.$^4$ ............................................. F16K 31/12
[52] U.S. Cl. ..................... 251/60; 251/363; 137/116; 137/223
[58] Field of Search ............... 251/60, 363, DIG. 1; 137/469, 116, 513, 223, 224, 528, 529, 115

[56] References Cited

U.S. PATENT DOCUMENTS

| | | | |
|---|---|---|---|
| 2,122,740 | 7/1938 | Eckenroth | 137/223 |
| 2,420,370 | 5/1947 | Hamilton | 137/469 |
| 2,490,559 | 12/1949 | Taccone | 251/60 |
| 2,597,057 | 5/1952 | Bergquist | 137/430 |
| 2,625,170 | 1/1953 | Mayer | 137/223 |
| 2,749,935 | 6/1956 | Heard | 137/116 |
| 2,861,585 | 11/1958 | Beeber | 137/115 |
| 2,960,996 | 11/1960 | Haselton | 137/116 |
| 3,762,433 | 10/1973 | Moore | 137/469 |
| 4,171,004 | 10/1979 | Cerrato et al. | 137/116 |
| 4,273,151 | 6/1981 | Nezworski | 137/115 |
| 4,378,028 | 3/1983 | Weber et al. | 251/363 |
| 4,425,934 | 1/1984 | Schefler | 137/223 |
| 4,470,428 | 9/1984 | Bishop et al. | 137/116 |
| 4,470,464 | 9/1984 | Balderko et al. | 137/117 |
| 4,473,093 | 9/1984 | Hart | 137/529 |

Primary Examiner—Samuel Scott
Assistant Examiner—H. A. Odar
Attorney, Agent, or Firm—Kenneth J. Hovet

[57] ABSTRACT

A combination valve for relieving excess pressure while also stopping downstream gas flow. A pull-type valve core is mounted within the gas flow passage of a valve body. It includes an actuating plunger operatively connected to a poppet that overlies the valve core and sealingly reciprocates against an upper portion of the valve body. The poppet includes a head portion with a central orifice. The poppet seats against an inner surface of a vented housing which encloses the poppet, valve core and valve body. A spring biases the poppet to its seated position allowing normal gas flow through the central orifice and valve core. Excessive gas pressure will overcome the spring force and allow the excess to vent out the housing. Unseating of the poppet also allows the actuating plunger to close the valve core and stop gas flow to downstream equipment.

17 Claims, 3 Drawing Figures

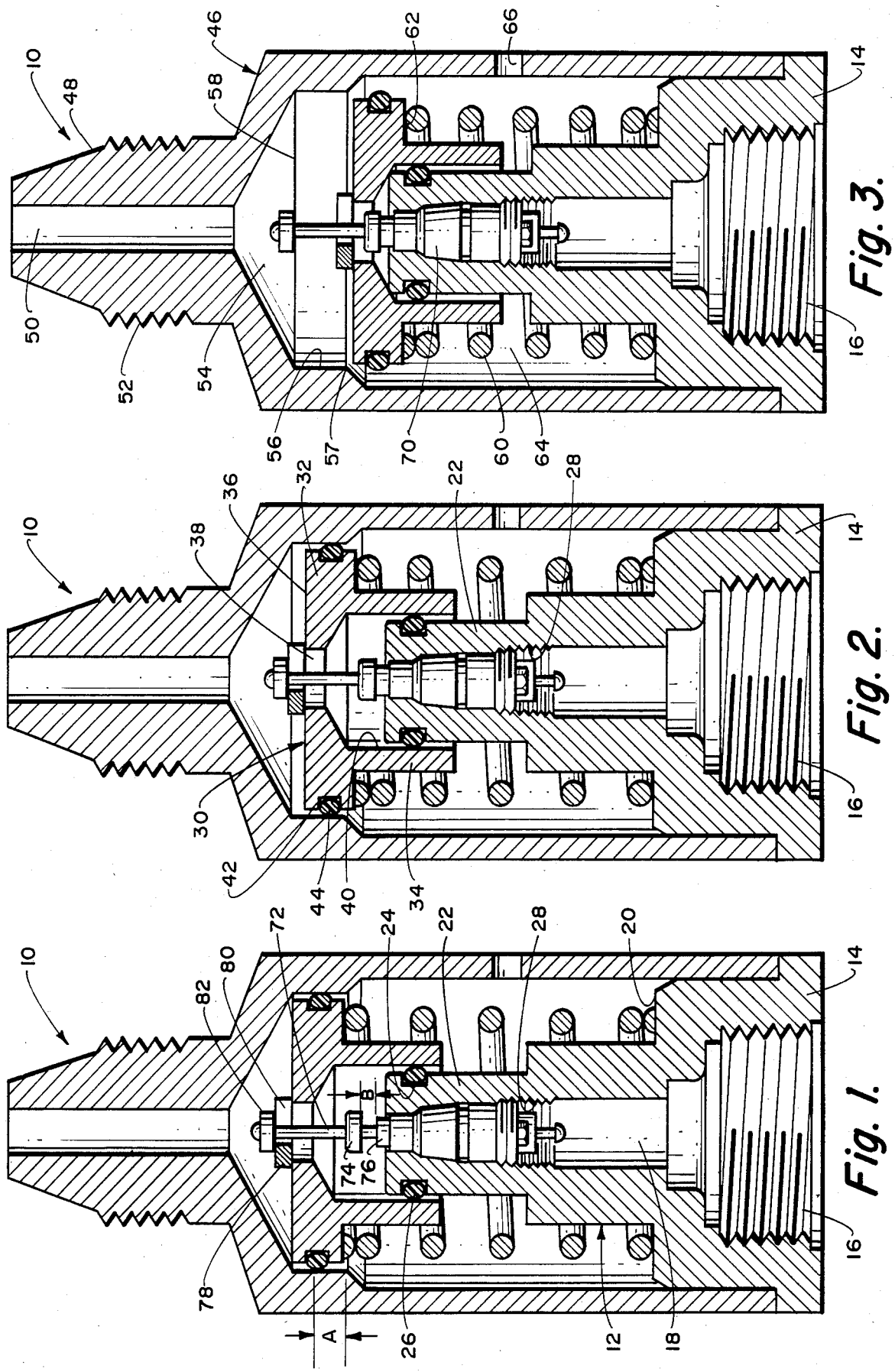

PRESSURE RELIEF AND SHUT-OFF VALVE

BACKGROUND OF THE INVENTION

1. Field of the Invention

The present invention relates to pressure relief valves and, more particularly, to a combination pressure relief and shut-off valve.

2. Description of the Prior Art

U.S. Pat. Nos. 4,273,151 and 4,171,004 both disclose safety relief valves having particular suitability for use with beverage dispensing equipment. U.S. Pat. No. 4,171,004 describes a device having a pressure regulator system with a diaphragm actuated stem valve. A reduced pressure chamber is formed between the diaphragm and stem valve which communicates with a combination shut-off valve and pressure relief valve. These operate to relieve excess pressure and prevent such pressure from reaching downstream equipment.

Because the shut-off valve and relief valve are preformed integral portions of one body, no relative adjustment between the two is possible. As such, even though the relief valve may be venting excess pressure, unless such pressure is abrupt or substantial, the shut-off valve will not completely stop flow to downstream equipment. This is a serious disadvantage—particularly with high pressure sources Also, not only does one preformed body comprise two valves, but gas flow to user equipment is dictated by predetermined passageways through the body. In essence, two valves must be replaced simply to alter gas flow rate or to make repairs or changes to one valve.

U.S. Pat. No. 4,273,151 discloses a safety relief valve whereby inline gas flow is deflected 90° by a baffle toward an offset valve pressure chamber. In this way, the valve will function regardless of direction of gas flow. While the baffle does create a pressure drop and diminish gas flow, no positive inline shut-off valve is provided.

SUMMARY OF THE INVENTION

An inexpensive, versatile and effective combination valve is provided that functions to relieve excess pressure while also protecting downstream lines and equipment. A valve core operates in conjunction with a relief valve to stop gas upon activation of the relief valve. A significant advantage is obtained whereby the valve core can be positioned relative to the relief valve to stop gas flow at varying excess pressure conditions. Also, the valve core is inexpensive and can simply be replaced upon malfunctioning or when use conditions require different valve core construction or when different gas flow characteristics are needed. Except for the specific embodiment referenced hereinbelow, "valve core" is intended to broadly cover devices having a movable shaft to which is attached a valve member that is biased against a stationary valve seat.

The combination valve of the present invention comprises an inner body part having an axial gas flow passage. A portion of the passage is threaded for engagement with a valve core. Over the inner body part fits a spring biased poppet. The poppet head reciprocates above the valve core and includes a central orifice through which a valve core plunger pin extends. The pin is connected to the poppet with a retention means having a gas flow passage therethrough. The above parts are enclosed by a vented housing having a connector portion for attachment to a pressure regulated gas source.

A compression spring urges the poppet against an annular sealing surface on the inside wall of the housing. The valve core is axially adjusted so that when the poppet is seated, the valve core will be open. This will then allow gas flow through the retention means, through the valve core and out the body part passage to downstream equipment. At a predetermined pressure, the compression force of the poppet spring will be overcome causing the poppet to move axially away from sealing engagement with the housing. This allows the valve core to return to its normally closed position and stop gas flow through the body part. Additional pressure and further movement of the poppet will allow the pressure to be relieved out the housing vent.

BRIEF DESCRIPTION OF THE DRAWINGS

FIG. 1 is a sectional view of the combination pressure relief and shut-off valve of the present invention in an open normal gas flow position.

FIG. 2 is a sectional view of the valve of FIG. 1 with both the shut-off valve and relief valve closed.

FIG. 3 is a sectional view of the valve of FIG. 1 with the shut-off valve closed and the relief valve open.

DESCRIPTION OF THE PREFERRED EMBODIMENT

With reference now to the drawings, the overall valve assembly of the invention is shown generally by reference numeral (10). The body part (12) includes a base connector portion (14) having internal threads (16) communicating with axial passageway (18) which extends through the longitudinal extent of the part. The base connector portion includes an annular shoulder (20) from which the part extends to an upper portion (22). The upper portion is provided with an annular groove (24) into which fits a resilient sealing ring (26).

Shown generally by reference numeral (30) is a poppet having head portion (32) from which extends an annular flange (34). The head portion includes top surface (36) and a central orifice (38). The poppet flange (34) is provided with an inner sealing wall (40) which engages the aforementioned sealing ring (26). This allows the poppet to reciprocate axially about the upper portion of the body part while maintaining a gas-tight seal therewith. The poppet head further includes an outer wall (42) which is grooved to allow for the placement of resilient sealing member (44).

Enclosing the poppet is housing (46). It includes a connector portion (48) having an opening (50) extending therethrough. The connector portion is provided with external threads for attachment to other fitments or lines.

The opening (50) merges into an upper chamber (54) of the housing. The upper chamber is sized to interfit with the poppet head portion (32) and includes an inner sealing surface (56) for sealing engagement with sealing member (44) that surrounds the poppet head. The inner sealing surface includes an abutment region (58) for limiting the upward movement of the poppet. The housing is secured to base portion (14) of the body part and includes a vent opening (66) through its sidewall.

The poppet is biased against the abutment region (58) of the inner sealing surface by housing spring (60). The spring is compressed between shoulder (20) of the body part and underside surface (62) of the poppet. The housing spring provides the force against which excess pressure operates to depress the poppet and allow such pressure to flow into the lower housing chamber (64) and escape out vent (66). This provides the pressure relief function of the overall assembly. Housing spring (60) can be exchanged to provide whatever predetermined excess pressure is desired for displacing the poppet.

Gas flow through axial passage (18) is controlled by valve core device (70). The preferred device is termed a "pull-type". Schrader Model No. 397T performs particularly well for the gas flows and pressures involved with the dispensing of beverages. The device includes a plunger pin (72) having a valve member (74) fixed thereto. The valve member is adapted to seal against valve seat (76). An internal spring (not shown) is included for urging the valve member into sealing engagement with the valve seat.

Under normal flow conditions with the poppet at rest against abutment region (58), the valve member is held apart from the valve seat a predetermined distance shown by arrows B in FIG. 1 by retention means. In the embodiment shown, retention means comprises retainer member (78) which overlies the orifice (38) and supports the plunger pin in an extended position The plunger pin extends through the central orifice and retainer member and terminates with an enlarged cap means (82) which is drawn against the retainer member and is maintained thereagainst by the aforementioned valve core inner spring, The retainer member is provided with slot (80) through which gas flows to the valve core device.

With the above arrangement, the plunger pin will move downwardly simultaneous with the poppet until the valve member comes to rest against the valve seat. This will then shut-off gas flow through the axial passage (18). The poppet can continue moving downwardly with the plunger pin remaining stationary in its lowermost position.

It will be appreciated that the axial distance "B" which the valve member must move to reach a closed position can be varied by adjustment means. As shown, such means comprises the threaded interior (28) of the axial passage with corresponding threads of the valve core device. This allows longitudinal adjustment within said passage of the valve core device with its concomitant variation in the motion distance of the valve member. Other means of varying the motion distance is by any one, or a combination of thicker retention members, spacer, set screws or pins for suspending the plunger pin over the orifice, including lock nuts, clips and key devices known in the art. Also, less preferably the valve core device could be secured within the axial passage by a tapered force fit, brazing, spot welding and the like.

It will be noted that the poppet sealing member (44) contacts surface (56) of the housing a longitudinal distance "A" above its lowermost edge (57). This defines an inner annular sealing surface. By having distance "A" greater than valve motion distance "B", a sequential operation will occur with the valve core closing first followed by an opening of the relief valve. As described, relief valve functioning occurs when the sealing member moves away from edge (57), thus permitting gas flow into chamber (64) and out vent (66). sequentially most readily with the various adjustment means enumerated hereinabove with regard to altering distance "B". Varying the height of poppet wall (42) or inner sealing surface (56) or the location of poppet sealing member (44) are other ways to effect adjustment.

Preferably, parts comprising the valve assembly of the present invention are aligned concentric to the longitudinal axis thereof. It is expected that the assembly will be mounted downstream from a gas pressure source and a regulator valve. However, it could be mounted directly to a pressure regulator.

As shown in the drawings, the device is threaded to operate inline between a regulated gas source and downstream equipment such as pressurized beverage containers or the like. Under normal gas flow conditions, the poppet top surface periphery will be in contact with abutment region (58). Resilient sealing member (44) will be in sealing engagement with the inner surface (56) of the housing. The housing spring compression strength will be such to allow poppet movement only when the pressure exceeds, for example, 40 psig. The longitudinal extent of the inner sealing surface of course, be at least equal to and preferably greater than the axial motion distance "B". When upstream gas pressure exceeds 40 psig, the poppet head will move downwardly a distance "B" whereby valve member (74) will seal against valve seat (76). Gas flow through the valve core device and axial passage will be shut-off thereby preventing any higher pressure from reaching and possibly damaging downstream lines, vessels, valves and seals. If pressure continues to increase, for example, to 50 psig, the poppet head will move further down until such movement exceeds axial distance "A". At this point, the resilient member will separate from the inner sealing surface (56) and gas will thereby enter the lower housing chamber (64) and flow out the vent opening (66). As the excess pressure is relieved out the vent, the poppet will move back into sealing engagement with the housing. Further upward movement will allow the retainer member to engage the plunger pin cap (28) and draw the valve member away from its valve seat. This will allow gas flow to return to its normal flow pattern, i.e., through opening (50), slot (80), through the valve core device flow channels and out the axial passage.

If different gases or pressure ranges are being utilized, the invention allows for ready adjustment or replacement of the valve core device and/or housing spring. The assembly automatically resets after excess pressure is relieved on the inlet side. It is inexpensive, nonbulky and a highly effective safety device—particularly for pressurized beverage dispensing equipment.

While the above assembly has been described with respect to preferred embodiments, it will be clear to those skilled in the art that other modifications and variations may be made without departing from the spirit and scope of the invention. As such, it will be understood that the invention is not to be limited by the above described specific embodiments, but only by the scope of the appended claims.

We claim:

1. A valve assembly comprising:
   a stationary body part having an axial passage;
   a valve core device with a gas flow path therethrough secured within said passage having an axially movable plunger pin with an attached valve member, said valve core device including a valve seat against which the valve menber is biased to close said flow path;
   a poppet having a head portion from which extends an annular flange that sealingly engages with an upper portion of said body part, said head portion having a central orifice in communication with the axial passage and including attachment means for engagement with the plunger pin; and, a housing enclosing said poppet and valve core device having a vent and a connector portion with an opening in communication with said passage, said housing having an inner sealing surface for engagement with said poppet head to control access to said vent including a housing spring biasing the head into engagement with said inner sealing surface, said inner sealing surface having a longitudinal extent at least equal to the axial distance between said valve member and valve seat when said poppet is sealingly engaged with said inner sealing surface and said gas flow path is open.

2. The assembly of claim 1 wherein said annular flange has an inner wall and the body part upper portion sealingly engages said inner wall.

3. The assembly of claim 2 wherein said upper portion is provided with a resilient sealing ring for said sealing engagement with said inner wall.

4. The assembly of claim 2 wherein said poppet includes an underside surface and said body part includes a base portion having a shoulder, said housing spring coiled about said body part and compressed between said underside surface and shoulder.

5. The assembly of claim 2 wherein said attachment means includes a retainer member for engaging the pin.

6. The assembly of claim 5 wherein said plunger pin extends through the central orifice and terminates thereabove with an enlarged cap means.

7. The assembly of claim 14 wherein said retainer member is slotted and overlies the central orifice.

8. The assembly of claim 1 including adjustment means for setting the axial distance between said valve member and valve seat.

9. The assembly of claim 8 wherein said adjustment means are selected from the group consisting of any one of combination of thread means, spacers, pins, tapered engagement members, clips, lock nuts, retainers and set screws.

10. The assembly of claim 8 wherein said valve core device has an exterior and said adjustment means includes a threaded portion of said axial passage for engagement with corresponding threads on said exterior.

11. The assembly of claim 1 wherein said inner sealing surface comprises an annular wall having a longitudinal extent greater than said axial distance.

12. The assembly of claim 11 including a resilient member forming a seal between said annular wall and a corresponding outer wall of the poppet head portion.

13. The assembly of claim 1 wherein said inner sealing surface includes an abutment portion for engagement with a portion of the top surface of said poppet head.

14. The assembly of claim 13 including an upper chamber in communication with said connector portion opening and said central orifice, said chamber formed by said housing above said top surface.

15. The assembly of claim 1 wherein the longitudinal axis of the connector portion opening, central orifice, valve core device and axial passage are aligned concentric to each other.

16. A valve assembly for connection between a regulated source of gas and user equipment comprising:

a shut-off valve for stopping flow of gas to the user equipment when the pressure exceeds a predetermined value comprising a stationary body part having an axial passage with a valve core device coaxially mounted within said axial passage said device actuated to open by a pressure relief valve for venting gas when the pressure exceeds a predetermined value, said relief valve comprising a poppet sealingly mounted for reciprocation upon said body part having a central orifice in a communication with said axial passage, a housing having a vent opening and an inlet in communication with said axial passage, said housing enclosing said poppet and including an inner surface for sealing engagement with said poppet, a spring urging the poppet into said sealing engagement until overcome with excess pressure against said poppet whereby movement of said poppet will allow said valve core device to close and allow excess gas to flow out the housing vent.

17. The assembly of claim 16 wherein said valve core device includes a plunger pin with retention means for engagement with said poppet.

* * * * *